March 9, 1926.

H. D. RANDALL

FINISHING MOLDING

Filed July 26, 1922

1,576,490

Inventor
Howard D. Randall
By Walter H. Murray
Attorney

Patented Mar. 9, 1926.

1,576,490

UNITED STATES PATENT OFFICE.

HOWARD D. RANDALL, OF CINCINNATI, OHIO, ASSIGNOR TO THE J. D. RANDALL COMPANY, OF CINCINNATI, OHIO, A CORPORATION OF OHIO.

FINISHING MOLDING.

Application filed July 26, 1922. Serial No. 577,665.

*To all whom it may concern:*

Be it known that I, HOWARD D. RANDALL, a citizen of the United States of America, and a resident of Cincinnati, in the county of Hamilton and State of Ohio, have invented a new and useful Improvement in a Finishing Molding, of which the following is a specification.

An object of my invention is to provide a finishing molding such as is generally used in the trimming of vehicles, which molding may be cheaply and expeditiously produced.

Another object of my invention is to provide a molding which, when applied, will not be disfigured by the nail heads employed in mounting the molding on a given structure.

Another object of my invention is to simplify the manufacture of moldings of the type referred to.

These and other objects are attained by means described herein and disclosed in the accompanying drawing, in which.

Figure 1:
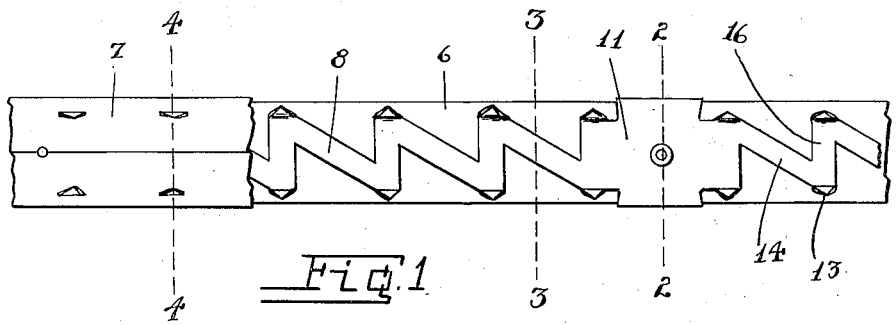
Fig. 1 is an inverted plan view of a strip of molding embodying my invention.
Figure 2:
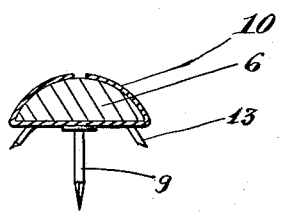
Fig. 2 is a sectional view on line 2—2 of Fig. 1.
Figure 3:
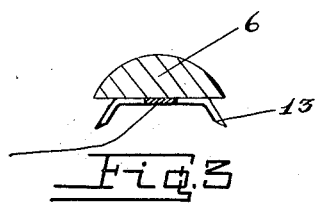
Fig. 3 is a sectional view on line 3—3 of Fig. 1.
Figure 4:
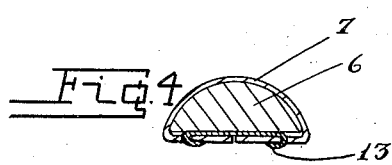
Fig. 4 is a sectional view on line 4—4 of Fig. 1.
Figure 5:
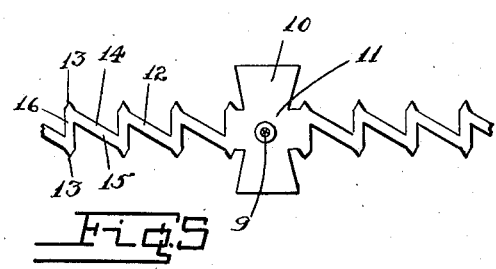
Fig. 5 is an inverted plan view of a fastening element forming a detail of my invention.

The core 6 is made of any suitable material, preferably of rubber, and may be given any form. A suitable covering 7 is secured upon the core by means of the fastening element 8 which element carries suitable means such as the nails 9 whereby the finished molding may be applied to a given structure. The cover 7 is preferably of leather. The fastening element 8 comprises preferably a number of spaced fingers 10, which may be turned over and clamped upon the core 6, the body 11, from which the fingers extend, carrying suitable fastening means such as the nails 9, and being integral with a zigzag structure 12 carrying spaced teeth 13 which are employed to secure the cover 7 upon the core 6. The body 11 together with the fingers 10 and the structure 12, is preferably made of a somewhat flexible metal having sufficient rigidity to secure the cover 7. The structure 12 is given the form shown, in order to dispose the teeth 13 in pairs, the teeth of each pair being disposed directly opposite whereby the edges of the cover 7 will be secured in substantially the same cross sectional plane when mounted upon the core. It is readily apparent that the teeth might assume a staggered relation lengthwise of the core, but this would have a tendency of drawing the cover somewhat and of creating a gap between the side edges of the cover. It is also apparent that the body portion 11 might be extended throughout the length of the core, and the teeth project therefrom in the same way as do the four teeth shown in Fig. 5, project from said body portion. In order to permit greater flexibility of the finished molding, and to permit the molding to be given various curves and turns, it is desirable to develop the material between adjacent body portions 11 into a narrow strip and to dispose teeth upon the strip in spaced relation. It is readily apparent that the strip 14 might be given a form such that the longitudinal portions 15 thereof might lie at substantially a right angle of the transverse portions 16 thereof, instead of being disposed at an angle one to the other as shown. The nails 9 or other fastening means, may be secured to the body 10 in any suitable manner such as being spot welded thereto. The teeth are bent away from the core so that the side edges of the cover may be pierced by said teeth, whereupon the teeth are turned over and are clinched or clamped inwardly, thereby securing the cover against displacement.

A molding made as disclosed herein may have the nails 9 thereof, driven directly into any structure, and after the molding is mounted, there will be apparent upon the cover thereof, no marks such as are common when mounting moldings which have generally been used heretofore. When applying moldings such as disclosed herein, it is preferable to use a form which may be placed over the molding immediately above the nail and upon which the blow of the hammer is delivered.

What I claim is:

1. A molding of the class described comprising a core, a cover for the core, and a strip extending lengthwise of the core, contacting the core and securing the cover upon the core.

2. A molding of the class described comprising a core, a cover for the core, a strip contacting the core and extending lengthwise of the core securing the cover upon the core, and means carried by the strip adapted to secure the molding upon a given structure.

3. In a molding of the class described the combination of a core, a strip extending lengthwise of the core, means carried by the strip whereby the strip may be secured upon the core, a cover for the core and means independent of the first named means carried by the strip whereby the cover may be secured upon the core.

4. In a molding of the class described the combination of a core, a strip extending lengthwise of the core, means carried by the strip whereby the strip may be secured upon the core, a cover for the core, means independent of the first named means and carried by the strip whereby the cover may be secured upon the core, and means carried by the strip whereby the molding may be secured upon a given surface.

5. In a finishing molding, the combination of a core, a cover for the core, a metallic strip extending lengthwise of the core, fingers extending from the strip adapted to be clamped upon the core, and teeth extending from the strip adapted to be clamped upon the cover.

6. In a finishing molding the combination of a core, a cover for the core, a metallic strip extending lengthwise of the core, fingers extending from the strip adapted to be clamped upon the core, teeth extending from the strip adapted to be clamped upon the cover, and means carried by the strip whereby the molding may be secured upon a given surface.

7. In a finishing molding the combination of a core, a cover for the core, and a strip extending lengthwise of the core having two rows of aligned teeth, the rows of teeth being disposed along opposite edges of the core and securing the opposite edges of the cover upon the core.

8. In a finishing molding the combination of a core, a cover for the core, a strip extending lengthwise of the core having two rows of aligned teeth, the rows of teeth being disposed along opposite edges of the core and securing the opposite edges of the cover upon the core, and means to secure the strip and the core upon one another.

9. In a finishing molding the combination of a core, a cover for the core, a strip extending lengthwise of the core having two rows of aligned teeth, the rows of teeth being disposed along opposite edges of the core and securing the opposite edges of the cover upon the core, means to secure the strip and the core upon one another, and means to secure the molding upon a given surface.

10. In a molding the combination of a core, a cover for the core, a strip extending lengthwise of the core, and teeth formed along the opposite edges of the strip adapted to be inserted thru the cover and to clamp the cover upon the core.

11. In a molding the combination of a core, a cover for the core, a strip extending lengthwise of the core, teeth formed along the opposite edges of the strip adapted to be inserted thru the cover and to clamp the cover upon the core, and means to secure the strip and the core upon one another.

12. In a molding the combination of a core, a cover for the core, and pairs of spaced teeth carried by the core and extending lengthwise thereof adapted to secure the edges of the cover upon the core.

13. In a molding the combination of a core, a cover for the core, a zigzag metallic strip extending lengthwise of the core, and teeth formed on the strip at the outer corners thereof, adapted to secure the cover upon the core.

14. In a molding the combination of a core, a cover for the core, a zigzag metallic strip extending lengthwise of the core, teeth formed on the strip at the outer corners thereof, adapted to secure the cover upon the core, and means to secure the strip upon the core.

15. In a molding the combination of a core, a cover for the core, a zigzag metallic strip extending lengthwise of the core, teeth formed on the strip at the outer corners thereof, adapted to secure the cover upon the core, means to secure the strip upon the core, and means to mount the molding on a given structure.

In testimony whereof, I have hereunto subscribed my name this 21st day of July, 1922.

HOWARD D. RANDALL.